Figure 1:
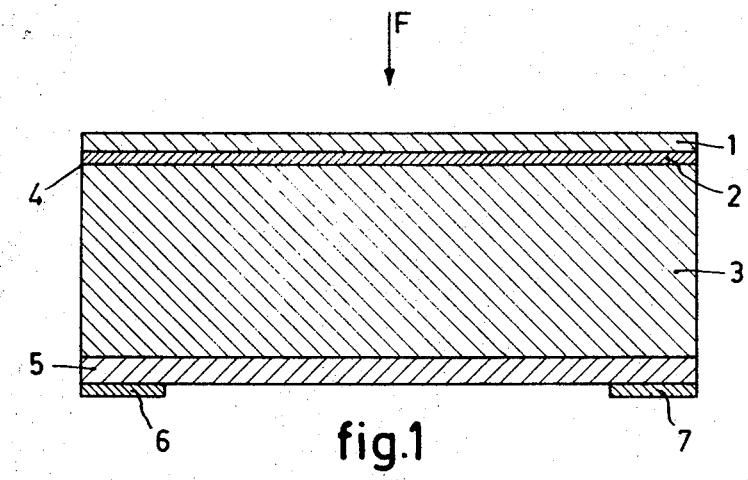

INVENTOR.
JOHANNES MEULEMAN
BY
AGENT

United States Patent

[11] 3,582,654

| [72] | Inventor | Johannes Meuleman<br>Rame-Caen, France |
|---|---|---|
| [21] | Appl. No. | 764,572 |
| [22] | Filed | Oct. 2, 1968 |
| [45] | Patented | June 1, 1971 |
| [73] | Assignee | U.S. Philips Corporation<br>New York, N.Y. |
| [32] | Priority | Oct. 9, 1967 |
| [33] | | France |
| [31] | | 123745 |

[54] RADIATION DETECTOR UTILIZING LATERAL PHOTOVOLTAIC EFFECT WITH EPITAUAL RESISTANCE LAYER
6 Claims, 2 Drawing Figs.

[52] U.S. Cl................................................ 250/83,
217/235, 250/83.3
[51] Int. Cl....................................................... G01e 1/29,
H01l 15/00
[50] Field of Search............................................ 250/83.3,
83; 217/235

[56] References Cited
UNITED STATES PATENTS
| 3,117,229 | 1/1964 | Friedland...................... | 250/83.3 |
| 3,152,939 | 10/1964 | Borneman et al............. | 317/235(43) |
| 3,225,198 | 12/1965 | Mayer.......................... | 250/83.3 |
| 3,396,318 | 8/1968 | Chow........................... | 250/83.3X |

Primary Examiner—Archie R. Borchelt
Assistant Examiner—Morton J. Frome
Attorney—Frank R. Trifari ABSTRACT: A radiation detector utilizing the lateral photovoltaic effect to establish the point of impact of incident radiation is described. On the back of the monocrystalline semiconductor is provided an epitaxial layer of lower resistance to which two contacts are made. By employing a separate epitaxial layer resistor instead of the detector body resistance, a number of advantages are obtained.

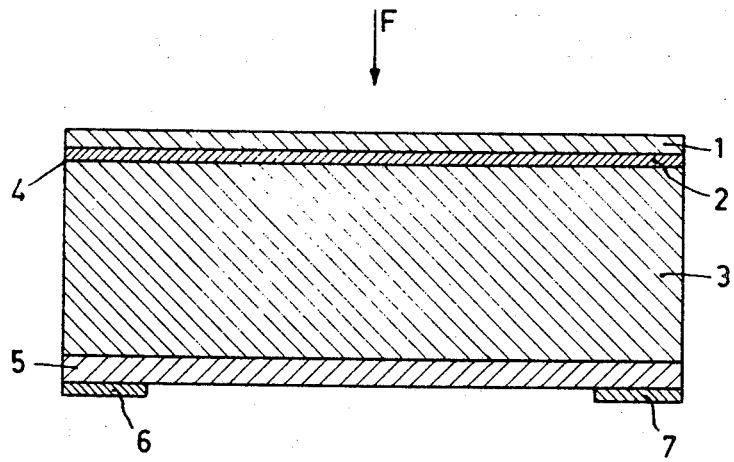

RADIATION DETECTOR UTILIZING LATERAL PHOTOVOLTAIC EFFECT WITH EPITAUAL RESISTANCE LAYER

The present invention relates to a detector for detecting and/or measuring radiation, in particular radiation of particles, comprising a semiconductor plate having a rectifying junction in which one of the large surfaces of the plate is provided with an electrode, the plate comprising on the oppositely located side a resistance layer which on the side remote from the plate is provided with at least two electrodes, and to a circuit arrangement comprising such a detector.

It is known that the determination of the position or the location of the particles is based upon a known effect, termed lateral photovoltaic-effect, according to which a charged particle traversing a semiconductor junction produces pairs of electron holes which generate not only a transverse current between the two sides of the junction but also lateral currents. These lateral currents received on a homogeneous collector layer, the resistance of which must be very weak and linear, in the form of voltage pulses and transmitted to contact electrodes suitably placed on the said layer, permit the location of the particle, for there exists a proportionality factor between the amplitude of the signals obtained and the distance of the point of impact at the said contacts.

It is also known that the rate and the time of collection of the carriers as well as the value of the received voltage depend not only on the nature of the collector layer but also on the depth of the depletion region, so on the applied inverse polarization voltage and on the resistivity of the semiconductor material constituting the detector: therefore, to maintain a good precision of measurement, in particular in the case in which the particles are not incident on the detector at right angles to its surface, it is necessary to limit said depth.

The radiation detectors for localizing particles are constructed as follows:

A semiconductor plate comprising a junction constitutes the body of the device and ensures the mechanical rigidity of the system.

Several electrodes are disposed on said plate. The first is arranged on the face of incidence of the particles, said face being previously covered by a film of a conductive metal while at least two electrodes are arranged on the opposite face.

In certain of the known detectors the depth of the depletion region does not cover the whole thickness of the semiconductor plate, said nondepleted layer plays the role of resistance. These detectors have numerous drawbacks:

1. The collector layer has the resistivity of the base plate which is not necessarily the optimum value for the resistance of the collector layer;
2. In the case of detectors of large dimensions, it is difficult to obtain a homogeneous crystal and hence a layer having a linear resistance;
3. The depth of the depletion region must be limited and it is therefore necessary to impose an exact value of the polarization voltage and to control it constantly.

In more recent detectors, the depletion region covers the whole thickness of the plate and the collector layer is realized by the deposition of a metal or a metal alloy on the face of the said plate opposite to the incident radiation. These detectors also have drawbacks:

1. The choice of the metals suitable for forming the collector layer is restricted;
2. It is difficult to realize and reproduce a homogeneous deposition in nature, thickness and hence constant resistance;
3. The adherence of the deposit to the plate is uncertain and due to the difference existing between the coefficients of expansion of the various elements, the shock resistance and thermal resistance remains mediocre;
4. The necessity of maintaining a good mechanical rigidity necessitates the use of thick plates, so of deep depletion regions, thus introducing an inaccuracy in the measurement in certain cases.

The present invention avoids said drawbacks. According to the invention, a detector of the type mentioned in the preamble is characterized in that the resistance layer is an epitaxial semiconductor layer having a lower resistivity than the plate.

The advantages of the detector according to the invention are as follows:

1. The progress accomplished in the last few years, in the epitaxial deposition methods permits of depositing and reproducing a perfectly homogeneous layer;
2. The substance, the thickness, the doping and the resistivity of the collector layer may be chosen in accordance with the plate or substrate used, and can easily be modified according to the characteristic desirable for the detector;
3. The quality of the mechanical connection between the collector layer and the substrate is excellent, this being due to the fact that the epitaxial layer which is allowed to grow on the surface forms one assembly with it which hence ensures on the one hand a uniform and efficacious contact and on the other hand a perfect resistance to shock and thermal treatments, thus augmenting considerably the reliability of the detector;
4. The polarization voltage of the detector may be chosen to be higher than the voltage which is necessary for forming the depletion region in the whole thickness of the plate and need no longer be maintained at a very accurate value and hence need not be applied by an apparatus of exceptional quality. Moreover, the fact that the voltage can be considerably increased improves the collection time;
5. The mechanical rigidity of the system may be ensured by the semiconductor plate of high resistivity but in a variation of the present invention it may also be ensured by the epitaxial layer itself which may be given a large thickness. So this variation permits of making the initial plate thinner and using the remaining fine layer of high resistivity as a depletion region as a result of which thinness of said layer an improvement of the accuracy of the measurement can be obtained.

Figure 2:
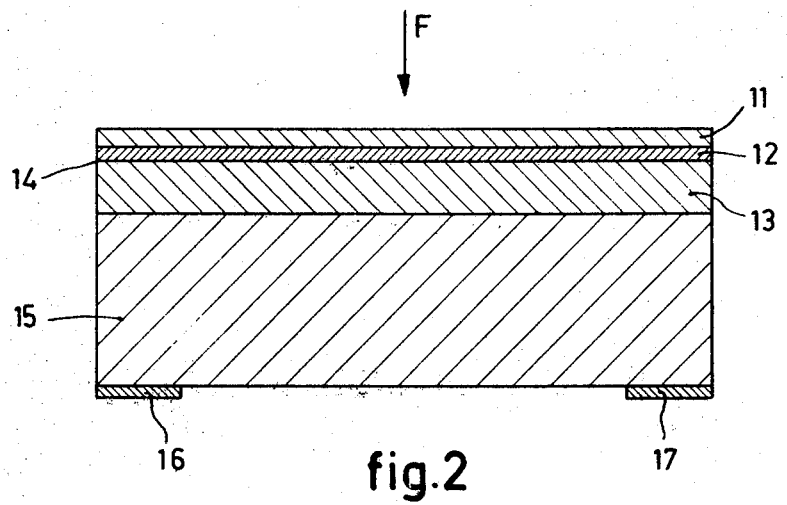

In order that the invention may be readily carried into effect, it will now be described in greater detail, by way of example, with reference to the accompanying drawing, in which FIG. 1 is a diagrammatic cross-sectional view of a first embodiment of a detector according to the invention, FIG. 2 is a diagrammatic cross-sectional view of a second embodiment of a detector according to the invention.

The detector shown in FIG. 1 is a semiconductor diode having a junction comprising superimposed successive layers; a first thin layer 1 of a noble metal traversed by the particles to be detected, the direction of which is indicated by the arrow F, is destined to serve as a contact electrode; an underlying layer 2 is an inversion layer developed in an oxidizing medium on a plate 3 of N-type silicon of high resistivity which ensures the mechanical rigidity. The layer 2 and the plate 3 thus constitute between them an abrupt junction denoted by the line 4. A layer 5 below the plate 3 is an epitaxial resistance layer of N+ type which is not so thick, strongly doped and hence of a lower resistivity. Parts 6 and 7 consisting of a noble metal and adhering to the face of the layer 5 opposite to the plate 3, form contact electrodes. An inverse polarization voltage is applied between the electrodes 1 on the one hand and 6 and 7 on the other hand, so that the detector may be compared with a capacitor the dielectric of which would become the depletion region thus formed. When a particle is incident on the detector surface, it traverses the layer 1 without being absorbed appreciably due to the very small thickness of said layer; in penetrating the crystal, it produces a charge at the terminals of the "capacitor" of the detector and said charge appears simultaneously in the form of signals at the electrodes 1, 6 and 7. The sum of the signals received at the electrodes 6 and 7 is equal to the signal received at the electrode 1, but of opposite polarity. A suitable external device amplifies and measures said signals thus permitting in known manner the localization of the impact of the particle.

Such a device can be simply manufactured: it consists, according to the conventional epitaxial deposition method, in causing to grow on a face of a monocrystalline plate or substrate of, for example, N-type silicon, of high resistivity (300-–10,000 ohm cm.), and having a thickness of the order of 200 $\mu$, a thin layer 5 of N+-type strongly doped and so of low resistivity ($10-10^{12}$ ohm cm.) which afterwards constitutes the collector layer.

The impurity concentration of the layer 5 preferably is at least of the order of $10^{14}$ to $10^{17}$ atm. per cc. and phosphorus is preferably used as a doping agent. The operation effected at a temperature of approximately 1300°C. for a few minutes, thus gives a thickness of 10 microns on said layer 5.

On the other face of the substrate 3, the junction 4 is provided by exposing the crystal and prolonged oxidation in air which produces the inversion layer 2. The exposure of the crystal may be effected by a chemical cleaning by means of a bath containing, for example, nitric acid, hydrofluoric acid and acetic acid.

The electrodes 1, 6 and 7 are then formed according to methods which are already known in semiconductor technology.

The dielectric layer of the detector is obtained by applying to the crystal an inverse polarization voltage determined by the thickness of the substrate and by the searched collection time.

With a device manufactured as described above it is possible to perform accurate measurements due to the linearity of the resistance constituted by the epitaxial layer. Moreover, due to the fact that it is possible to choose a substrate of high resistivity, to form an abrupt junction and to apply a voltage which is much higher than the value necessary for depleting the whole thickness of the said substrate, the collection time of the carriers may be brought to approximately 0.1 ns. and consequently said device may be used up to frequencies in the order of 10 GHz.

In the second embodiment shown in FIG. 2, the detector receives the particles (arrow F) through a thin metal layer 11 serving as an electrode; an underlying layer 12 is identical to the layer 2 of FIG. 1 and forms, with a plate or substrate 13 of a low thickness, an abrupt junction denoted by the line 14, the said plate 13 being in the present case of silicon of N-type of high resistivity. A layer 15 represents the epitaxial layer $n+$ which serves as a support and on which are fixed the electrodes 16 and 17. In manufacturing this detector the starting material may be a substrate 13 of high resistivity having a thickness of the order of 200$\mu$ on one of the faces of which an epitaxial layer 15 of low resistivity but of great thickness, of the order of 150 to 200$\mu$ is made to grow.

The thickness of the substrate 13 is then reduced by a mechanical grinding operation and chemical attack of its face opposite to the layer 15 so that only a thin layer of, for example, 10 microns thickness remains. The chemical attack then forms the inversion layer 12 which may be improved by exposure to air.

The electrodes 11, 16 and 17 are then formed in a conventional manner.

This second embodiment provides a supplementary element of improving the detector: In fact it is known that it may be interesting for reasons of mounting or reliability (notably breakdown) to obtain an entirely depleted region while using only a voltage of a limited value: this method provides said possibility since the region of high resistivity is of a very low thickness and thus may be depleted with a low voltage.

It will be obvious that many variations of the above described embodiments are possible to those skilled in the art without departing from the scope of this invention.

I claim:

1. A radiation detector comprising a monocrystalline semiconductor body having a first electrode on one major surface and adjacent the first electrode a rectifying junction which when back-biased establishes a depletion layer by which charge carriers generated due to incident radiation may be separated and collected, said body further comprising on the side remote from the said first electrode an epitaxial semiconductor layer crystallographically related to the monocrystalline body, said epitaxial layer having a resistivity that is lower than that of the semiconductor body, and second and third spaced electrodes on the surface of said epitaxial layer remote from the body whereby the epitaxial layer portions between the second and third electrodes act as a resistor during collection of the carriers.

2. A detector as set forth in claim 1 wherein the body is of $n$ conductivity and the epitaxial layer is of $n+$ conductivity, the body being arranged to receive the radiation to be detected on the surface containing the first electrode, said first electrode being transparent.

3. A detector as set forth in claim 1 wherein the thickness of the epitaxial layer is smaller than that of the body.

4. A detector as set forth in claim 1 wherein the thickness of the epitaxial layer is larger than that of the body.

5. A detector as set forth in claim 1 wherein the plate resistivity is at least 300 ohm-cm, and the epitaxial layer resistivity is at most 10 ohm-cm.

6. A detector as set forth in claim 1 and including means for applying a reverse voltage across the rectifying junction such that the depletion layer fills substantially entirely the space in the body between the junction and the epitaxial layer.

UNITED STATES PATENT OFFICE
CERTIFICATE OF CORRECTION

Patent No. 3582654            Dated June 1, 1971

Inventor(s) JOHANNES MEULEMAN

It is certified that error appears in the above-identified patent and that said Letters Patent are hereby corrected as shown below:

Col. 3, line 4, "$10 - 10^{12}$" should read -- $10 - 10^{-2}$ --.

Signed and sealed this 19th day of October 1971.

(SEAL)
Attest:

EDWARD M. FLETCHER, JR.      ROBERT GOTTSCHALK
Attesting Officer             Acting Commissioner of Patents